United States Patent
Tevs et al.

(10) Patent No.: US 9,888,623 B2
(45) Date of Patent: Feb. 13, 2018

(54) SYSTEMS FOR MONITORING SEEDS AND METHODS THEREOF

(71) Applicant: Deere & Company, Moline, IL (US)

(72) Inventors: Nikolai Tevs, Daytona Beach Shores, FL (US); Jeffrey S. Puhalla, Hawley, MN (US); Elijah B. Garner, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/689,318

(22) Filed: Aug. 29, 2017

(65) Prior Publication Data

US 2017/0359947 A1 Dec. 21, 2017

Related U.S. Application Data

(63) Continuation of application No. 14/991,210, filed on Jan. 8, 2016.

(51) Int. Cl.
| | |
|---|---|
| *G01J 1/44* | (2006.01) |
| *A01C 7/10* | (2006.01) |
| *G01V 8/20* | (2006.01) |
| *A01C 7/20* | (2006.01) |

(52) U.S. Cl.
CPC .............. *A01C 7/102* (2013.01); *A01C 7/206* (2013.01); *G01J 1/44* (2013.01); *G01V 8/20* (2013.01)

(58) Field of Classification Search
CPC ......... A01C 7/102; A01C 7/105; G06M 1/101
See application file for complete search history.

(56) References Cited

U.S. PATENT DOCUMENTS

| | | | |
|---|---|---|---|
| 4,555,624 | A | 11/1985 | Steffen |
| 5,883,383 | A | 3/1999 | Dragne |
| 8,618,465 | B2 | 12/2013 | Tevs et al. |
| 8,669,514 | B2 | 3/2014 | Kjartanson |
| 2010/0116974 | A1 | 5/2010 | Liu et al. |
| 2012/0067262 | A1 | 3/2012 | Wilhelmi et al. |
| 2016/0374263 | A1 | 12/2016 | Steffen |

FOREIGN PATENT DOCUMENTS

| | | |
|---|---|---|
| EP | 1566089 A1 | 8/2005 |
| EP | 1662247 A1 | 5/2006 |
| GB | 2132395 A | 7/1984 |
| WO | WO-2005096798 A | 10/2005 |

OTHER PUBLICATIONS

Extended European Search Report dated May 12, 2017.

*Primary Examiner* — Marcus Taningco
(74) *Attorney, Agent, or Firm* — Harness, Dickey & Pierce, P.L.C.

(57) ABSTRACT

At least one example embodiment discloses a seed monitoring system including a light source configured to emit light in an interior of a seed tube, a plurality of light receivers, each of the plurality of light receivers configured to receive light in at least two sectors of a plurality of sectors of a plane in the interior of the seed tube and generate a sensing signal corresponding to the received light, a processing system including a plurality of conditioning channels, the processing system configured to process the sensing signals to generate conditioned signals and a controller configured to generate a seed count value based on the generated conditioned signals.

19 Claims, 13 Drawing Sheets

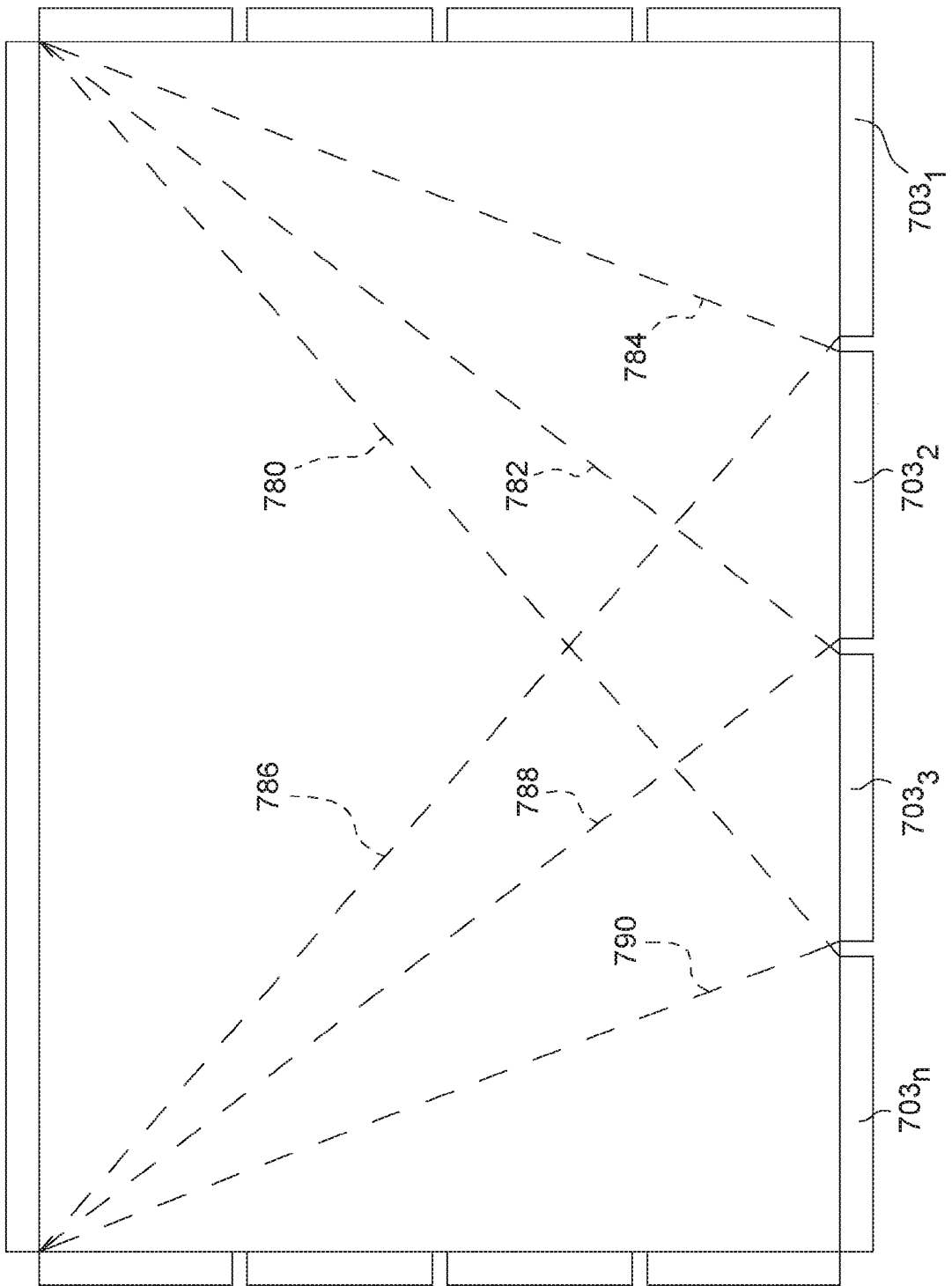

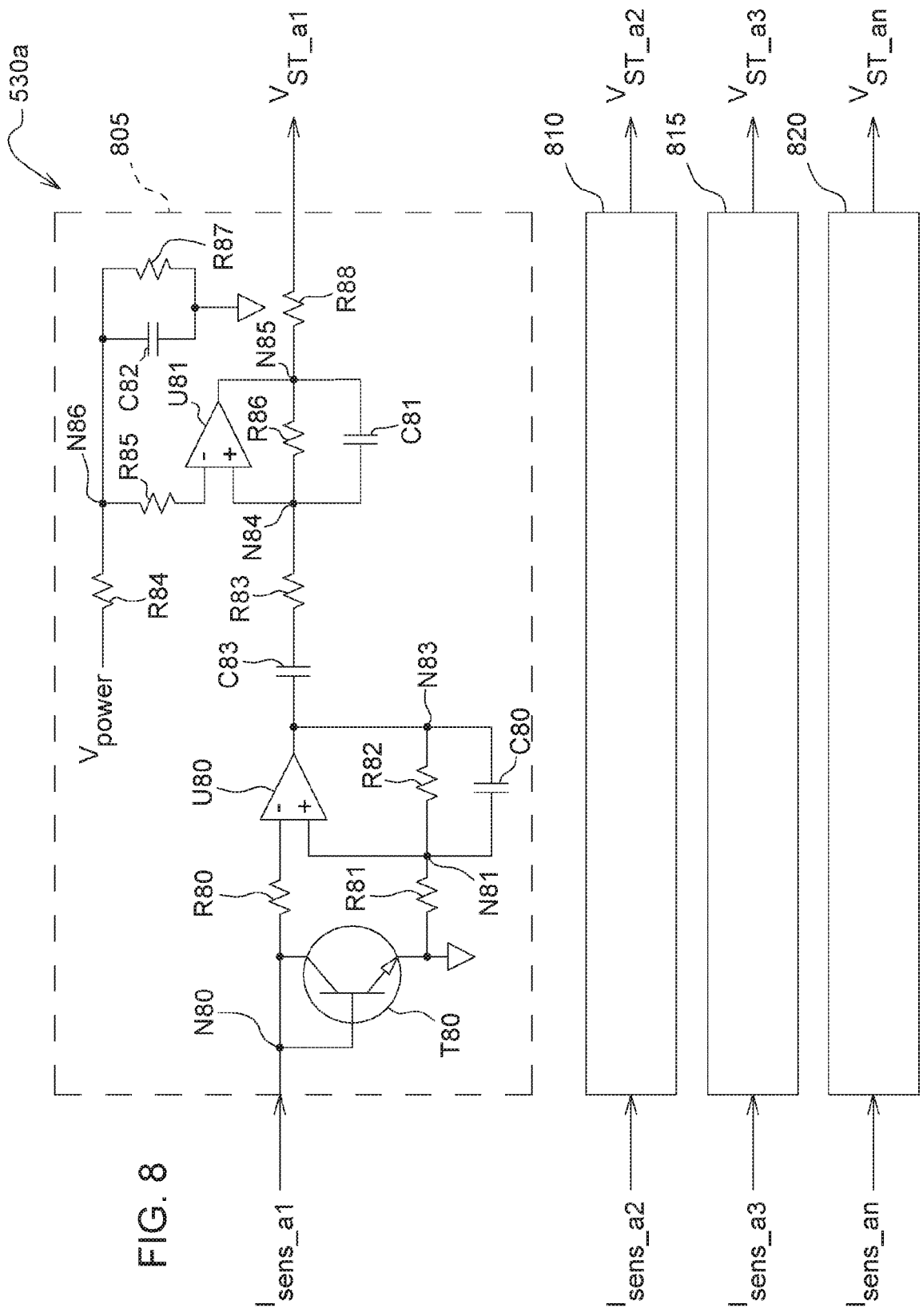

SYSTEMS FOR MONITORING SEEDS AND METHODS THEREOF

PRIORITY STATEMENT

This application is a continuation application of and claims priority under 35 U.S.C. §120/121 to U.S. application Ser. No. 14/991,210 filed Jan. 8, 2016, the contents of which are hereby incorporated herein by reference in their entirety and for all purposes.

FIELD

Example embodiments are related to systems for monitoring seeds and methods of monitoring the seeds. Such methods and systems may be used in agricultural seeders and planters, for example.

BACKGROUND

Advances in agricultural seeding machinery have made it possible to seed large swaths of farmland with each pass of a seeding machine. Air seeders typically include a dry holding tank for maintaining seeding material and a hose with applicator for applying the seeding material into furrows or blowing seeding material onto the surface of a prepared field. Modern air seeders may further include controls that allow the operator to configure the machine. Further, air seeders may allow simultaneous application of seed, fertilizers, and any other material useful in ensuring rapid germination and healthy growth cycle.

Optical monitoring systems can detect and count the number of seeds dispensed or planted by the seeder, or the planting density of the seeds, for each row of the planter or the entire planter.

SUMMARY

Exposure of optical monitoring systems to contaminants such as dust, dirt, debris and organic material from the seed and environment, can degrade the system performance. In field operation, a layer of dust accumulates on the optical windows of certain prior art sensing systems causing light from emitters to be refracted in unpredictable directions such that seed counts are duplicated or undetected.

At least some example embodiments disclose a seed counting system having a plurality of light receivers. The light receivers are arranged such that if a performance of one of the light receivers is degraded by dust or debris, at least one other light receiver compensates to avoid inaccuracies in a seed count or seed density.

At least some example embodiments disclose a seed counting system having three parallel channels of signal conditioning. Each of the channels has a selected gain and bandwidth associated with a seed type.

At least one example embodiment discloses a seed counting system including a light source configured to emit light along a plane of an interior of a seed tube, a light receiver configured to receive the light and generate a sensing signal corresponding to the received light, the receiver opposing the light source on the plane of the interior of the seed tube, a processing system including a plurality of conditioning channels, the processing system configured to process the sensing signal using at least a selected one of the plurality of conditioning channels to generate a first conditioned signal and a controller configured to generate a seed count value based on the first conditioned signal.

At least another example embodiment discloses a seed counting system including a light source configured to emit light along a plane of an interior of a seed tube, a plurality of light receivers around the plane of the interior of the seed tube, each of the plurality of light receivers configured to receive light in at least two sectors of a plurality of sectors of the plane and generate a sensing signal corresponding to the received light, a processing system including a plurality of conditioning channels, the processing system configured to process the sensing signals to generate conditioned signals and a controller configured to generate a seed count value based on the generated conditioned signals.

At least another example embodiment discloses a method of monitoring seeds. The method includes emitting light, by a light source, along a plane of an interior of a seed tube, receiving light, by a plurality of light receivers, in at least two sectors of a plurality of sectors of the plane and generating a sensing signal corresponding to the received light, processing the sensing signals to generate conditioned signals and generating a seed count value based on the generated conditioned signals.

BRIEF DESCRIPTION OF THE DRAWINGS

Example embodiments will be more clearly understood from the following detailed description taken in conjunction with the accompanying drawings. FIGS. 1-11 represent non-limiting, example embodiments as described herein.

FIG. 1 illustrates a side view of an air seeding machine including a seed monitoring system according to an example embodiment;

FIG. 2 illustrates a seed monitoring system according to an example embodiment;

FIG. 3 illustrates a cross-sectional view of a seed tube showing a light transmitter and light receiver of the seed monitoring system according to an example embodiment;

FIG. 4 illustrates a conditioning circuit in the seed monitoring system shown in FIG. 2 according to an example embodiment;

FIG. 5 illustrates a seed monitoring system according to an example embodiment;

FIG. 6 illustrates a cross-sectional view of a seed tube showing a light transmitter and a plurality of light receivers of the seed monitoring system according to an example embodiment;

FIGS. 7A-7C illustrate coverage areas of the plurality of light receivers shown in FIG. 6, according to an example embodiment;

FIG. 8 illustrates a conditioning circuit in the seed monitoring system shown in FIG. 5 according to an example embodiment;

FIG. 9 illustrates a method of determining a seed count value according to an example embodiment.

DETAILED DESCRIPTION

Figure 1:
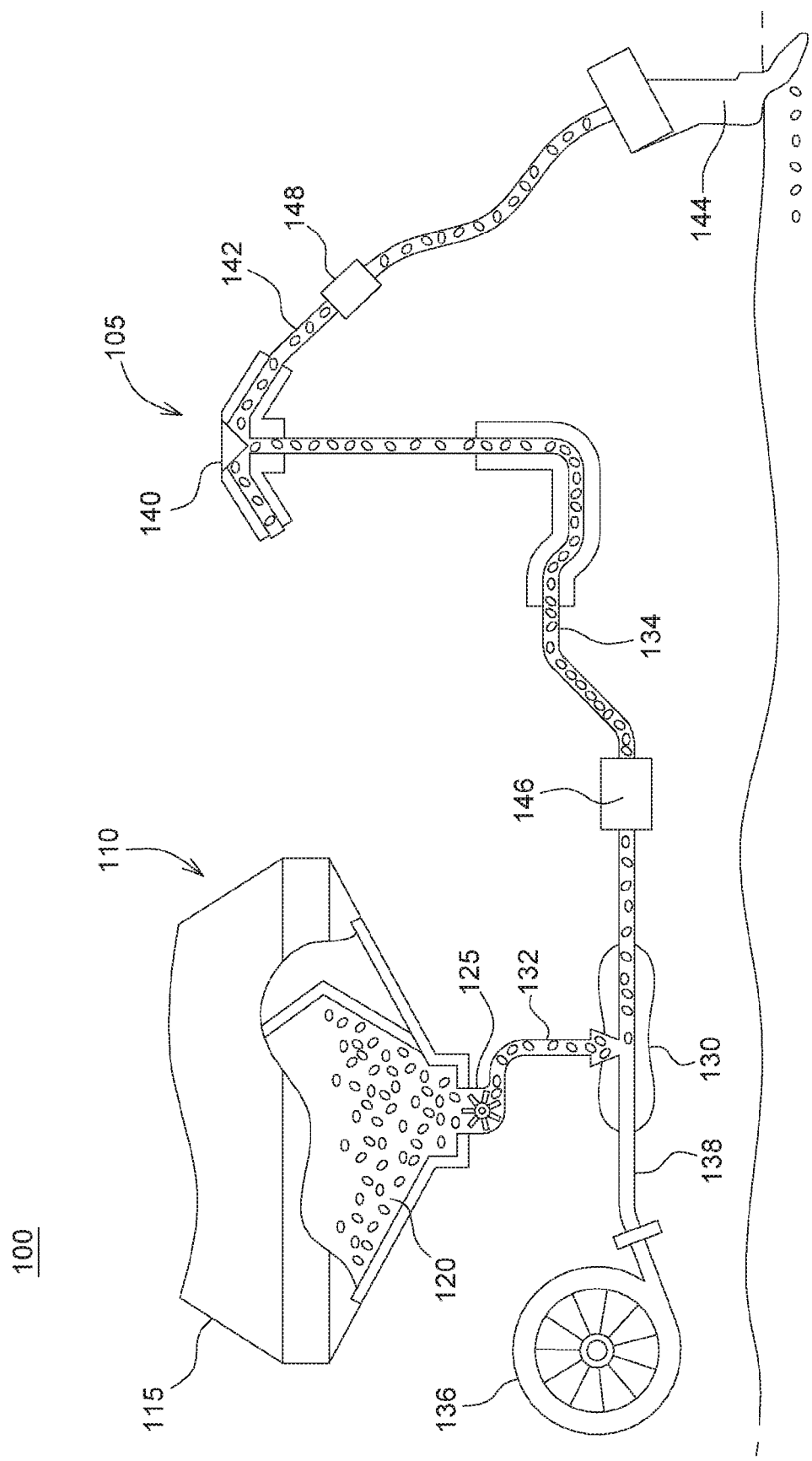

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

FIG. 1 illustrates a side view of an air seeding machine including a seed monitoring system according to an example embodiment.

The illustration and description thereof is presented for explanation only and is not intended to limit the scope of example embodiment. Practitioners will appreciate that the disclosed monitoring system may be implemented as a component of any type of seeding machine, wherein seed product is dispersed onto/into a growing medium. In one embodiment, an existing seeding machine may be retrofitted with the disclosed seed monitoring system. In another embodiment, the hardware components for the disclosed seed monitoring system are implemented within a seeding machine during the manufacture process.

As shown in FIG. 1, a seeder assembly 110 includes a holding tank 115 that holds varying quantities of seed material to be dispensed by an air seeding machine 105. More specifically, the holding tank 115 maintains seed and any other application suitable for the purposes described herein, such as fertilizers and herbicides. Relative to the description of the seed monitoring system, the air seeding machine 100 will be described relative to the functions of dispensing seeds 120 of any suitable type.

In one embodiment, the flow of seeds 120 from the holding tank 115 is controlled by a rotary dispenser 125. The controlled flow of the seeds 120 from the rotary dispenser 125 distributes the seeds 120 into a primary manifold 130 by way of a suitable conduit 132. A plurality of primary seed conduits 134 are connected to the primary manifold 130 to receive the flow of seeds 120 from the holding tank 115. In accordance with one embodiment, the number of primary seed conduits 134 is directly related to the number of rows that the seeding machine 100 is configured to simultaneously seed.

A blower 136 is connected to the primary manifold 130 by a hose 138. The blower 136 provides air pressure to the primary manifold 130 so as to cause the seeds 120 to move through the primary manifold 130 and into the primary seed conduits 134 under air pressure. Each primary seed conduit 134 is connected to a separate secondary manifold 140. A plurality of secondary seed conduits 142 are connected to each of the secondary manifolds 140. In the embodiment, pluralities of secondary seed conduits 142 are connected to each secondary manifold 140. In various configurations, each secondary seed conduit 142 may be connected to a configurable blade-like device that carves furrows in the soil, such that the seeds 120 are dispensed at an appropriate depth into the soil.

In an example embodiment, a monitoring system 148 is positioned on each secondary seed conduit 142 to monitor the seed flow through the secondary seed conduits 142. The term conduit and tube may be used interchangeably and are not limiting to the particular shape of the enclosure used to convey the seeds.

As will be described in detail below, the seed monitoring system 148 includes various optical emitters and receivers configured in such a way that enables the monitoring system to accurately count seeds as they pass through the secondary seed conduit 142. While generally described herein as being positioned on the secondary seed conduit 142, those of ordinary skill in the art will appreciate that the disclosed seed monitoring system according to example embodiments may be positioned within any conduit, hose, or the like where a seed passes from a holding tank 115 to the seed applicator 144. Moreover, the seed monitoring system may be configured to function at multiple locations within a seeding machine 100 simultaneously, such that the multiple seed monitoring systems may, for example, provide a more accurate seed count.

Figure 2:
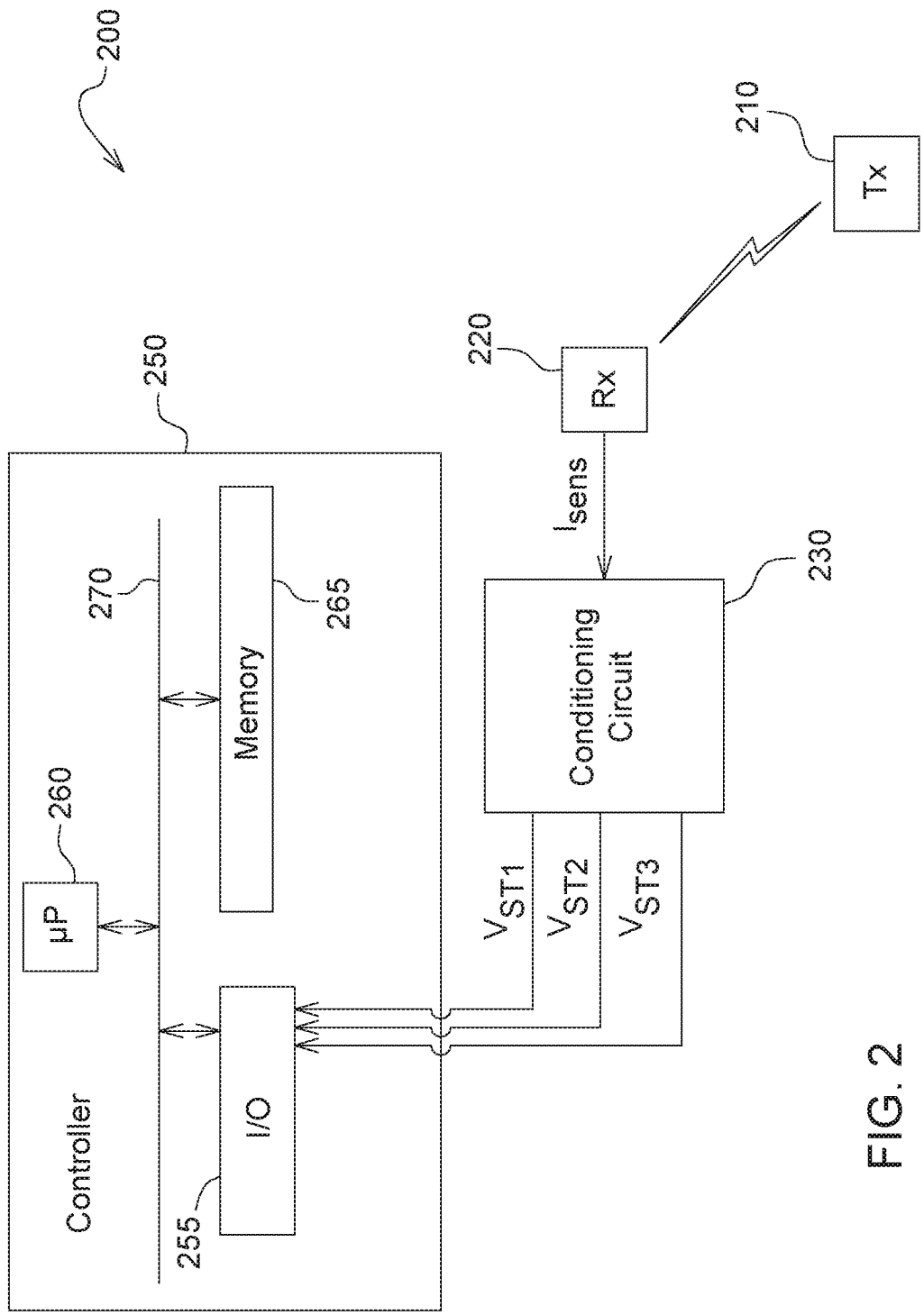

FIG. 2 illustrates an example embodiment of a seed monitoring system shown.

A seed monitoring system 200 includes a light source 210, a light receiver 220, a conditioning circuit 230 and a controller 250. The controller includes an input/output (e.g., analog inputs) 255, a microprocessor 260 and a memory 265. The microprocessor 260 may exchange data with the I/O 255 and the memory 265 using a data bus 270. The microprocessor 260 may execute instructions stored in the memory 265 to perform the functions described below. The terms "memory," "storage medium" or "computer-readable medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term terms "memory," "storage medium" or "computer-readable medium" may include, but is not limited to, portable or fixed storage devices, optical storage devices, and various other mediums capable of storing, containing or carrying instruction(s) and/or data.

The light source 210 emits light alone a plane of an interior of the seed tube 142. The light source 210 may include an array of light emitting diodes (LEDs).

The light receiver 220 receives the light and generates a sensing signal $I_{sens}$ from the amount of light received by the light receiver 220. The light receiver 220 may be a single photodiode. However, example embodiments are not limited thereto.

Figure 3:
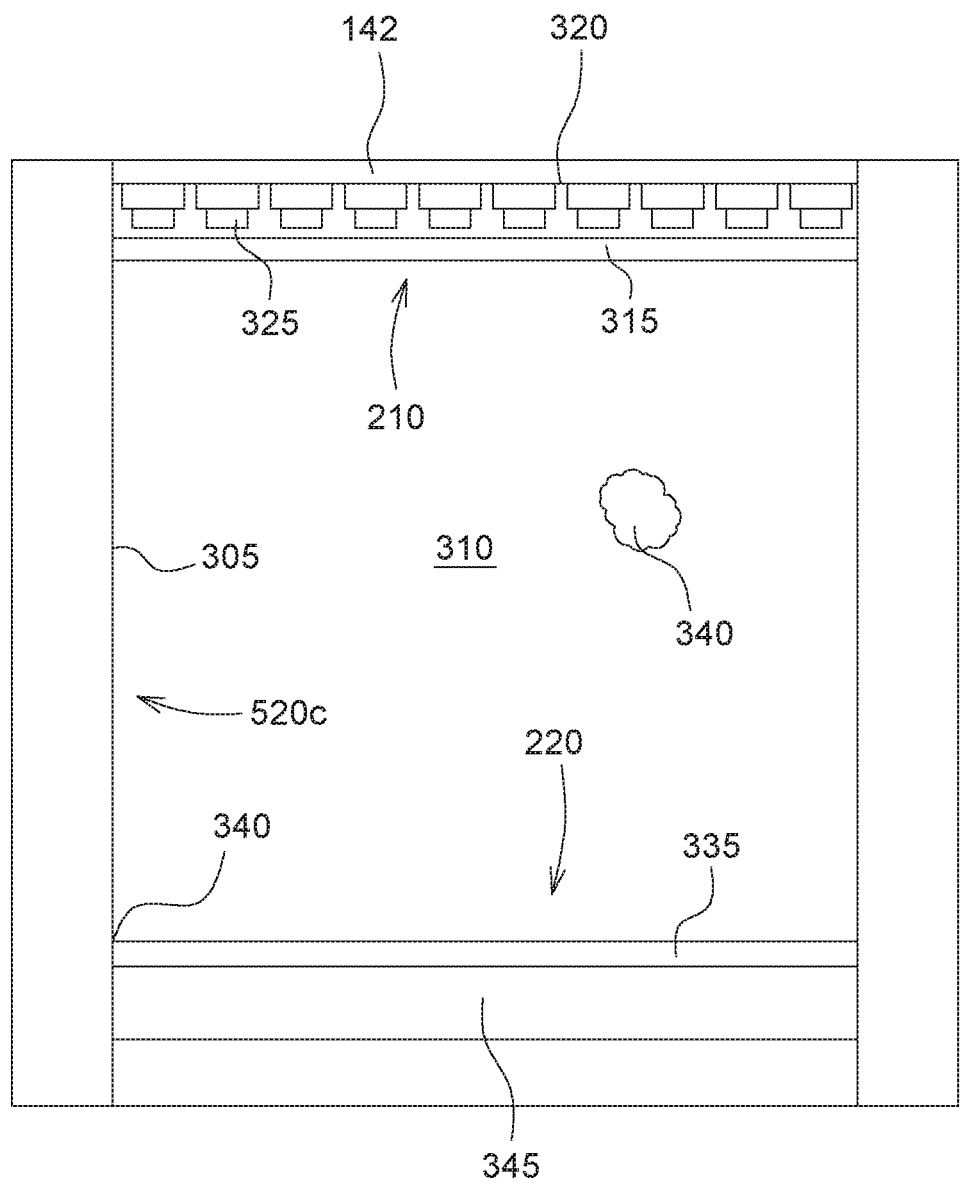

FIG. 3 illustrates a cross-sectional view of a seed tube showing the light source 210 and the light receiver 220 of the seed monitoring system 200 according to an example embodiment.

The light source 210 is positioned along one side of an interior periphery 305 of the seed tube 142 such that an emitter window 315 illuminates an entire interior area 310 in the x-y plane (i.e., a cross-section of the seed tube 142). The interior area 310 is defined by the interior periphery 305. The light source 210 includes the emitter window body 315 secured within an emitter housing 320. The emitter housing 320 includes an array Light Emitting Diodes (LED) or similar 325, which is configured to generate constant light of a specific wavelength. For example, to avoid compromising the input values of receiver 220, the LED may produce light in the Infrared (IR) range of the spectrum as to be distinguished from light contamination from visible light sources. The LEDs 325 may be mounted to a PC board with conductive strips forming electrical connections with the LEDs 325 mounted thereon.

The light receiver 220 is positioned at an opposite side of the periphery 305 from the light source 210. The light receiver 220 may include a window body 335 secured within a receiver housing 340. The receiver housing 340 includes an optic receiver 345 such as, for example, a photodiode, phototransistor, and other semiconductor type cells.

In the example embodiment shown in FIG. 3, the seed monitoring system includes the light source 210, which is configured to illuminate the light receiver 220. The positioning of the light source 210 and the light receiver 220 form a planar sensing area, particularly when light source 210 produces a wide-beam light.

As will be appreciated by those of ordinary skill in the art, the light source 210 may comprise an illumination source, which is housed within an enclosure. Because an LED chip provides 360 degrees of planner illumination, the housing 320 is configured to restrict the illumination angle to 180 degrees in the x-y plane. The window 315 is positioned on an open side of the housing 320 and may be produced from translucent plastic, glass, or mineral. The emitter window 315 may include a texture or additive during manufacture to diffuse light from the LED.

Dependent on the configuration of the light receiver 220, the light source 210 may be configured to provide constant or intermittent illumination. Moreover, the brightness of the light source 210 may be controlled by way of voltage adjustments for incandescent type light bulbs or by way of current adjustment for an LED. In embodiments where modification of light source 210 properties is desirable or used, the LEDs may be controlled by a driver circuit and/or controller circuit such as the controller 250.

Similar to the light source 210, the light receiver 220 may include the sealed housing 340. The receiver housing 340 includes a window to allow light to pass through the sealed housing to the optic receiver 345. In various example embodiments, the window may also be further configured to filter specific wavelengths of light. For example, the window may filter light such that light falling outside of the wavelength range is blocked. This is most often facilitated by treating the window 315 with a tint or shade that causes certain wavelengths of light to reflect, thereby causing the undesirable light to reflect off of the inner surface rather than pass through it. Varying technologies exist for measuring light and/or properties of light and the selection of a sensor type may be based on the specific implementation of the disclosed monitoring system.

When a seed 340 falls through the seed tube 142 between the light source 210 and the light receiver 220, there will be a change in the radiation incident upon the optic receiver 345. In other words, the seed 340 will momentarily block a part of the radiation traveling across the seed tube 142. The change in radiation incident on the optic receiver 345 indicates that a seed has passed.

Referring back to FIG. 2, the light receiver 220 generates the sensing signal $I_{sens}$ based on the light sensed by the optic receiver 345. The sensing signal $I_{sens}$ indicates the amount of light sensed by the optic receiver 345.

Referring back to FIG. 2, the light receiver 220 sends the sensing signal $I_{sens}$ to the conditioning circuit 230. The conditioning circuit 230 has a plurality of conditioning channels that are arranged in parallel. Each conditioning channel includes a filter (e.g., an amplifying filter or an active filter) that has a bandwidth and a gain associated with properties of the seed (seed type) and the seed delivery system.

Gravity-fed and pneumatically-fed are two types of seed delivery systems. The bandwidth ref the corresponding filter is tuned differently for gravity-fed versus pneumatically-fed.

In a gravity-fed system, for example, parameters used for determining the bandwidth include seed size (e.g., sizes of wheat, soy and canola), a seed velocity and a probability of overlapping seeds.

Thus, a conditioning channel for soy may also be used for other relatively larger seeds such as corn whereas a conditioning channel for canola may be used for other relatively smaller seeds.

The gain and bandwidth of each conditioning channel is selected to generate a desired (e.g., optimal) signal-to-noise ratio for a specific seed size and to generate desired (e.g., optimal) output signals $V_{ST1}$-$V_{ST3}$ that the controller 250 can use for determining a seed count value for the seed type. The gain and used bandwidth of the conditioning channels are calculated for specific seed types and expected seed velocities.

Figure 4:
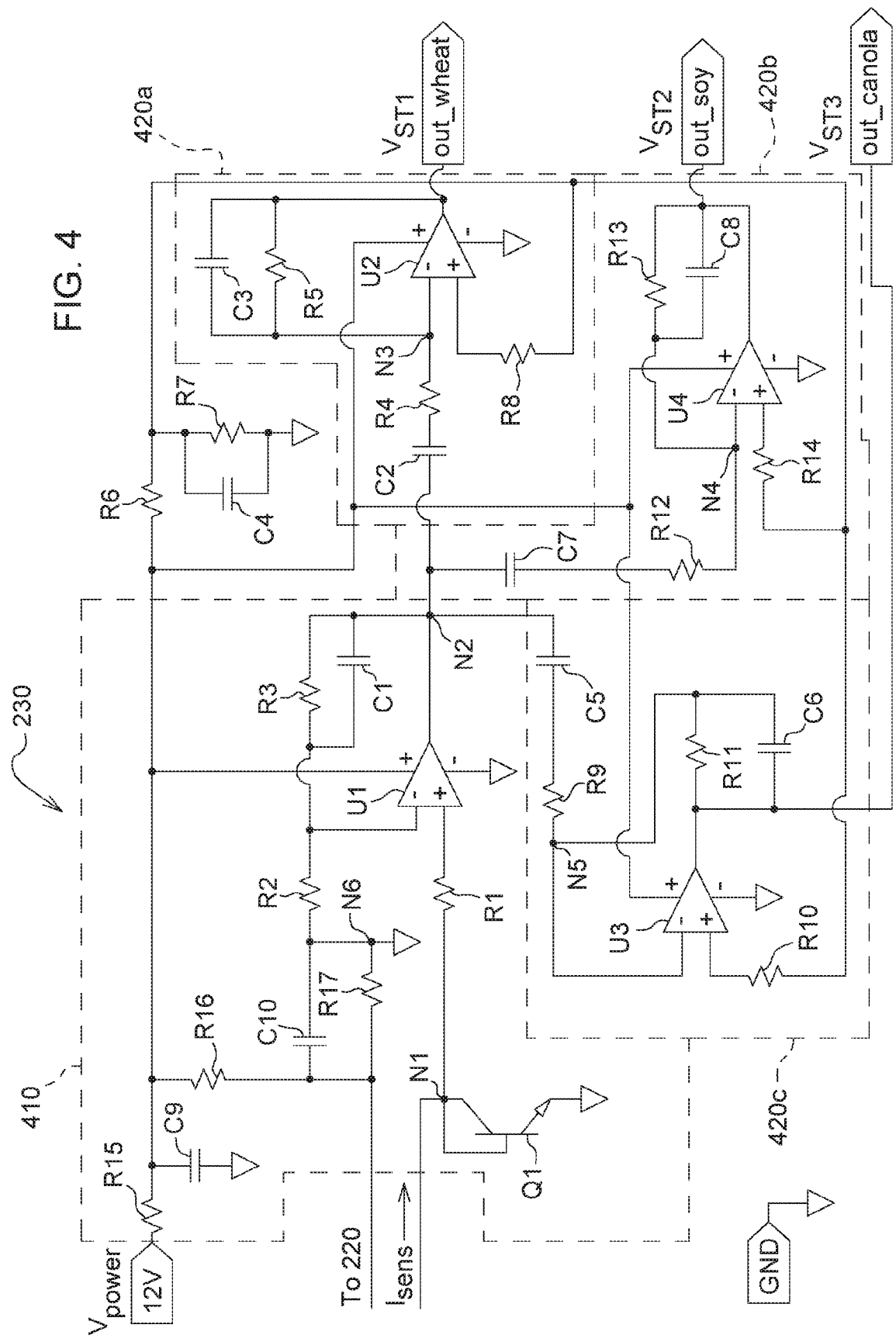

FIG. 4 illustrates an example embodiment of the conditioning circuit 230. The conditioning circuit 230 includes a preamplifier circuit 410 and first, second and third conditioning channels 420a-420c.

The preamplifier circuit 410 includes a transistor Q1, an operational amplifier U1, resistors R1-R3, resistors R15-R17 and capacitors C1, C9 and C10. The preamplifier circuit 410 receives the sensing signal $I_{sens}$ and a power supply voltage $V_{power}$ (e.g., 12V). A voltage drop across the transistor Q1 is a voltage that will be pre-amplified and conditioned.

The sensing signal $I_{sens}$ is input to a node N1 of the preamplifier circuit 410. The transistor Q1 may be an n-p-n transistor and may operate as a diode. A collector of the transistor Q1 and a base of the transistor Q1 are also connected to the node N1. The transistor Q1 outputs a signal proportional to the light modulation created by the change in radiation incident on the light receiver 220.

The resistor R1 is connected between the node N1 and a positive input of the preamplifier U1.

The resistor R15 and the capacitor C9 form a power supply low-pass filter that suppresses a high-frequency noise on a power supply line to the amplifiers U1, U2, U3 and U4. A first end of the resistor R15 is connected to the power supply voltage $V_{power}$. A second end of the resistor R15 is connected to first ends of the capacitor C9 and resistor R16, respectively. Moreover, the second end of the resistor R15 is connected to positive power supply inputs of the amplifiers U1, U2, U3 and U4.

A second end of the resistor R15 is connected to first ends of the capacitor C10 and the resistor R17. The capacitor C10 and the resistor R17 are connected in parallel between the second end of the resistor R16 and a node N6. The resistors R16-R17 and the capacitor C10 form a voltage divider and low-pass filter to get a voltage supply voltage (e.g., 5V) for the receiver 220. For example, the voltage supply generated by the resistors R16-R17 and the capacitor C10 may be provided to a cathode of a photodiode.

The node N6 is connected to ground and a first end of the resistor R2. A second end of the resistor is connected to the negative input of the amplifier U1 and first ends of the resistor R3 and the capacitor C1, respectively. Second ends of the resistor R3 and the capacitor C1, respectively, are connected to a second node N2. A ratio of resistances of the resistors R3/R2 determines a gain of the preamplifier circuit 410, the capacitor C1 limits a bandwidth of the preamplifier circuit 410.

The preamplifier U1 operates by amplifying a voltage at the node N1 (e.g., 0.5-0.6 V) to a voltage at the second node N2 (e.g., 2-2.4V). Each of the conditioning channels 420a, 420b and 420c is connected to the second node N2. The resistors R6-R7 and the capacitor C4 form a voltage divider and low-pass filter to get a bias voltage (e.g., 0.8V) for the amplifiers U2-U4 of the conditioning channels 420a, 420b and 420c, respectively. The capacitor C4 and the resistor R7 are connected in parallel between ground and a second end of the resistor R6, which is connected to second ends of resistors R8, R14 and R10, respectively.

When detecting seeds, a larger seed will generate a larger/longer shadow over the optic receiver 345 than a smaller seed. Thus, if a same conditioning channel were used for each type of seed, varying signal strengths would be detected. More specifically, a large shadow will generate a large signal whereas a small shadow will generate a low signal. As a result, the smaller seeds may not be detected.

If a conditioning circuit gain is not desired (e.g., not optimal), a large seed might saturate the amplifier and the frequency content of the signal would be distorted. That will decrease the accuracy of multiple seed detection. Small seed signals might be below the detection threshold or their frequency content might be insufficient for multiple seed detection.

Therefore, the each of the conditioning channels 420a, 420b and 420c has a selected bandwidth and a selected gain corresponding to the associated seed type (e.g., seed size). Thus, a smaller seed will be detected by the conditioning channel associated with the smaller seed.

The first conditioning channel 420a includes capacitors C2-C3, resistors R4-R5 and R8 and an amplifier U2. A first electrode of the capacitor C2 is connected to the second node N2 and a second electrode of the capacitor C2 is connected to a first end of the resistor R4. A second end of the resistor R4 is connected to a third node N3, which is a negative input of the amplifier U2. A positive input of the amplifier U2 is connected to a first end of the resistor R8. A second end of the resistor R8 is connected to the resistor R6. An output of the amplifier U2 outputs a conditioned signal $V_{ST1}$ corresponding to a first seed type. The resistor R5 and the capacitor C3 are connected in parallel between the output of the amplifier U2 and the node N3.

The first conditioning channel 420a has a selected gain and a selected bandwidth associated with the first seed type such as wheat Gain and used bandwidth of each conditioning channel is calculated for a specific range of seed dimensions and expected seed velocities. Thus, the capacitances of the capacitors C2-C3 and the resistances of the resistors R4-R5 are selected such that the first conditioning channel 420a has the selected gain and the selected bandwidth.

The second conditioning channel 420b includes capacitors C7-C8, resistors R12-R14 and an amplifier U4. A first electrode of the capacitor C7 is connected to the second node N2 and a second electrode of the capacitor C7 is connected to a first end of the resistor R12. A second end of the resistor R12 is connected to a fourth node N4, which is a negative input of the amplifier U4. A positive input of the amplifier U4 is connected to a first end of the resistor R14. A second end of the resistor R14 is connected to the resistor R6. An output of the amplifier U4 outputs a conditioned signal $V_{ST2}$ corresponding to a second seed type. The resistor R13 and the capacitor C8 are connected in parallel between the output of the amplifier U4 and the node N4.

The second conditioning channel 420b has a selected gain and a selected bandwidth associated with the second seed type such as soy. Thus, the capacitances of the capacitors C7-C8 and the resistances of the resistors R12-R13 are selected such that the second conditioning channel 420b has the selected gain and the selected bandwidth.

The third conditioning channel 420c includes capacitors C5-C6, resistors R9-R11 and an amplifier U3. A first electrode of the capacitor C5 is connected to the second node N2 and a second electrode of the capacitor C5 is connected to a first end of the resistor R9. A second end of the resistor R12 is connected to a fifth node N5, which is a negative input of the amplifier U3. A positive input of the amplifier U3 is connected to a first end of the resistor R10. A second end of the resistor R10 is connected to the resistor R6. An output of the amplifier U3 outputs a conditioned signal $V_{ST3}$ corresponding to a third seed type. The resistor R11 and the capacitor C6 are connected in parallel between the output of the amplifier U3 and the node N5.

The third conditioning channel 420c has a selected gain and a selected bandwidth associated with the third seed type such as canola. Thus, the capacitances of the capacitors C5-C6 and the resistances of the resistors R9 and R11 are selected such that the third conditioning channel 420c has the selected gain and the selected bandwidth.

As shown in FIG. 4, separate active band-pass filter circuits are illustrated for each seed type, where a resistor-capacitor feedback (e.g., parallel R-C circuit or pairs (C3, R5; C8, R13; C6, R11)) between the amplifier output and negative input of the operational amplifier and a series resistive-capacitive circuit (e.g., C2, R4) at the negative input controls the frequency response of the filter. The gain of the operational amplifier can be controlled by a ratio of resistors (e.g., R5/R4, R11/R9 and R13/R12).

Referring back to FIG. 2, the conditioning circuit 230 sends the output of each conditioning channel $V_{ST1}$-$V_{ST3}$ to the analog inputs of the controller 250.

The processor 260 selects an output having a maximum non-saturated amplitude out of the outputs of the conditioning channels $V_{ST1}$-$V_{ST3}$. The processor 260 then determines a seed count value based on the selected conditioned signal $V_{ST1}$-$V_{ST3}$. The processor 260 may utilize a known/conventional method to analyze the selected conditioned signal $V_{ST1}$-$V_{ST3}$ to determine the seed count value.

Moreover, a user may select which seed type is being planted. However, the controller 250 issues a warning if the selected channel saturates or outputs small amplitudes (i.e., the user selected the wrong seed type). The controller 250 may select the seed type based on which of the conditioned signals $V_{ST1}$-$V_{ST3}$ satisfy expected values stored in the memory 265.

In FIG. 2, the seed monitoring system includes a light source configured to emit light along a plane of an interior of a seed tube, a light receiver configured to receive the light and generate a sensing signal corresponding to the received light, the receiver opposing the light source on the plane of the interior of the seed tube, a processing system including a plurality of conditioning channels, the processing system configured to process the sensing signal using at least a selected one of the plurality of conditioning channels to generate a first conditioned signal and a controller configured to generate a seed count value based on the first conditioned signal.

In an example embodiment, the plurality of conditioning channels are connected to a common input and have a plurality of outputs, respectively, and the outputs are coupled to the controller.

In an example embodiment, the processing system further includes a preamplifier configured to amplify the sensing signal and output the amplified sensing signal to the common input.

In an example embodiment, the plurality of conditioning channels are associated with seed size ranges, respectively.

In an example embodiment, each of the plurality of conditioning channels has a selected bandwidth and a selected gain corresponding to the associated seed size range.

In an example embodiment, the seed size ranges are different.

In an example embodiment, the light receiver is a single photodiode.

Figure 5:
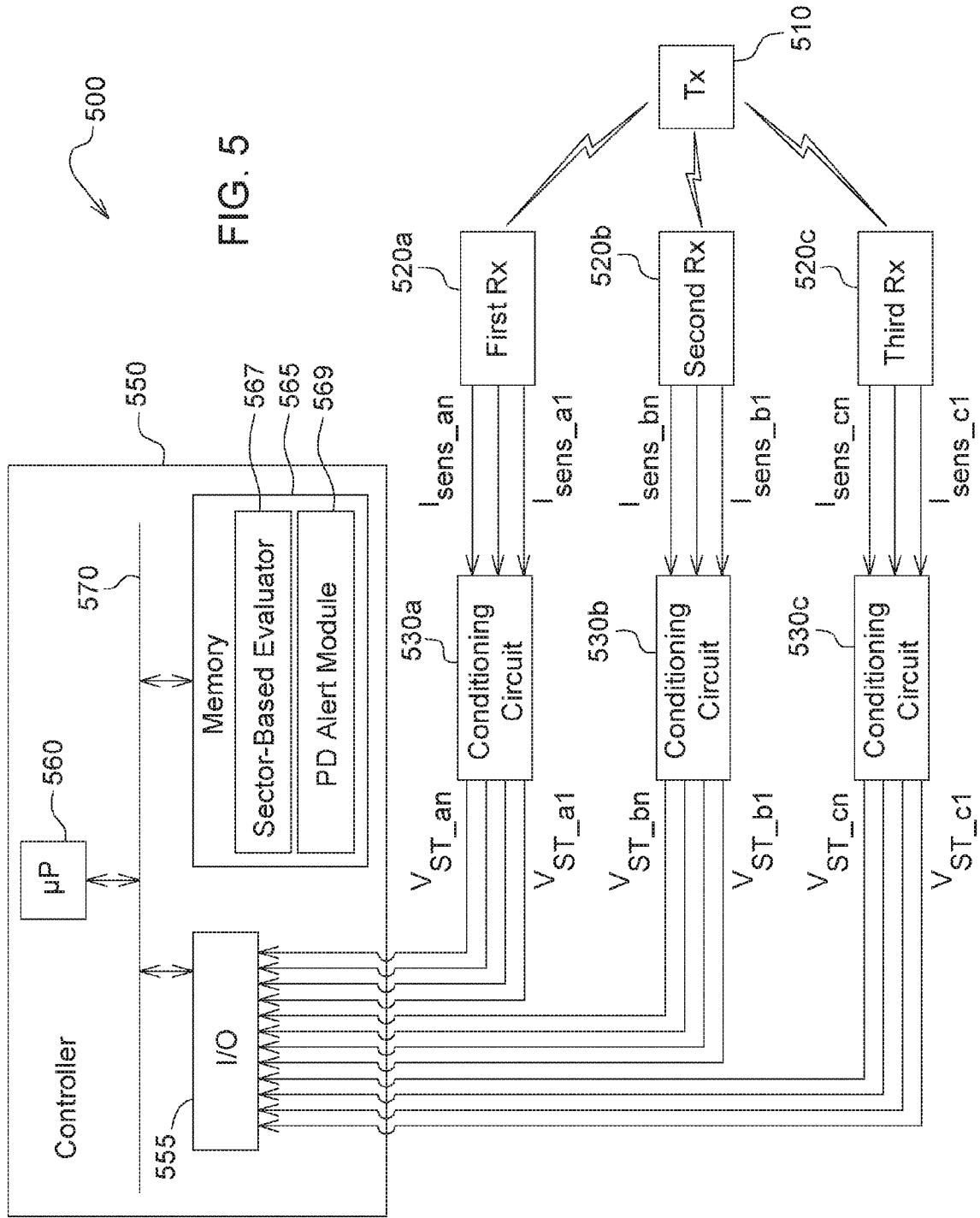

FIG. 5 illustrates a seed monitoring system according to another example embodiment.

A seed monitoring system 500 includes a light source 510, a plurality of light receivers 520a, 520b, 520c, conditioning circuits 530a, 530b, 530c and a controller 550. The controller includes an input/output (e.g., analog inputs) 555, a processor 560 and a memory 565. The memory may store a sector-based evaluator 567 and a photodiode alert module 569 as programs (i.e., instructions). The processor 560 may exchange data with the I/O 555 and the memory 565 using a data bus 570. The processor 560 may execute instructions stored in the memory 565 to perform the functions described below.

The light source 510 emits light alone a plane of an interior of the seed tube 142. The light source 510 may include an array of light emitting diodes (LEDs).

The light receivers 520a-520c receive the light and generate sensing signals $V_{sens\_a1}$-$V_{sens\_an}$, $V_{sens\_b1}$-$V_{sens\_bn}$, $V_{sens\_c1}$-$V_{sens\_cn}$ from the amount of light received by the light receivers 520a-520c.

Figure 6:
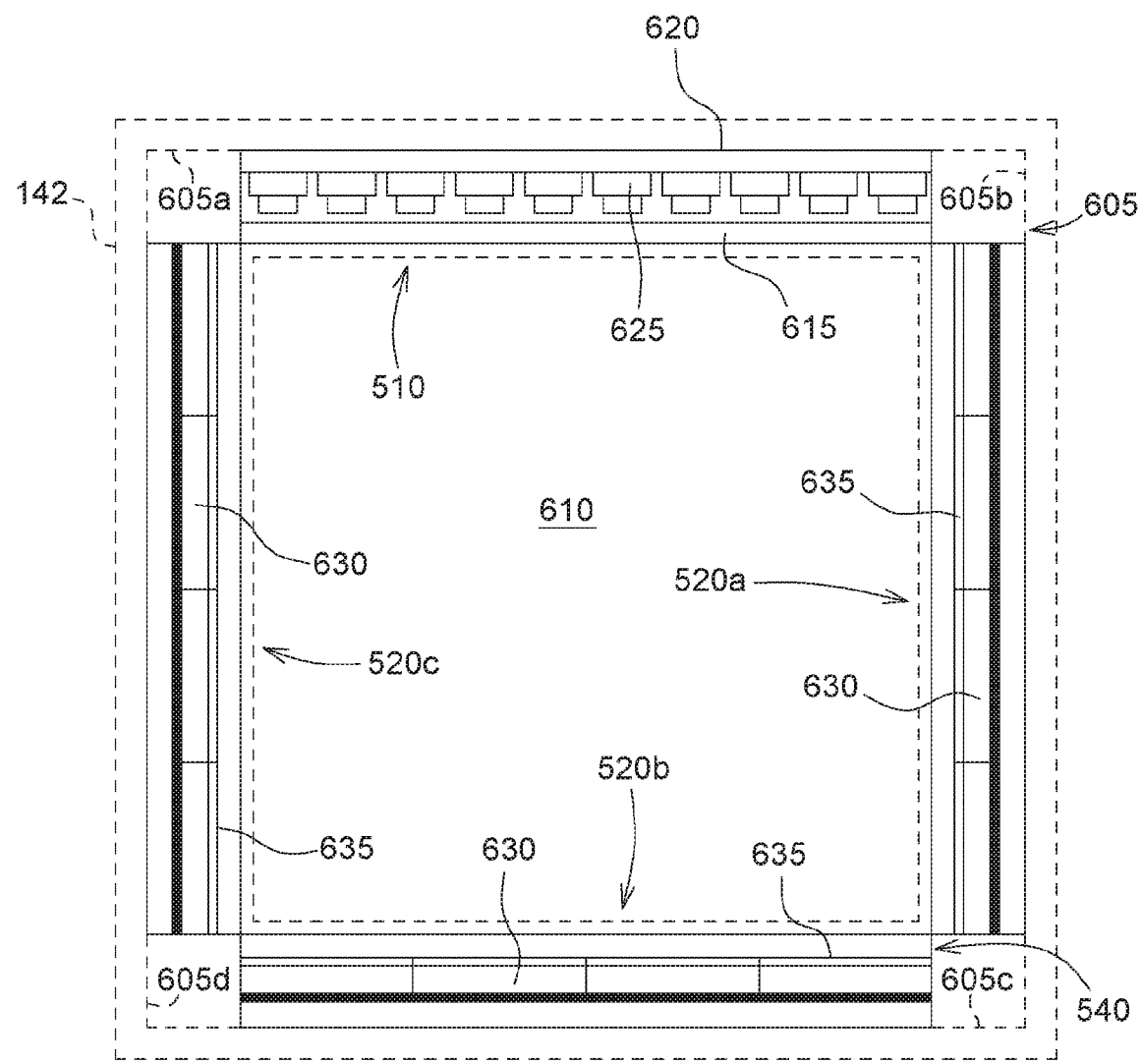

FIG. 6 illustrates a cross-sectional view of a seed tube showing the light source 510 and the light receivers 520a-520c of the seed monitoring system 500 according to an example embodiment.

The light source 510 is positioned along one side 605a of the interior periphery of the seed tube 142 such that an emitter window 615 illuminates an entire interior area (planar sensing area) 610 along the x-y axis (i.e., a cross-section of the seed tube 142). The planar sensing area 610 is defined by sides 605a, 605b, 605c and 605d of the interior periphery. The light source 510 includes the emitter window body 615 secured within an emitter housing 620. The emitter housing 620 includes an array Light Emitting Diodes (LED) or similar 625, which is configured to generate constant light of a specific wavelength. For example, to avoid compromising the input values of the light receivers 520a-520c, the LED may produce light in the Infrared (IR) range of the spectrum as to be distinguished from light contamination from visible light sources. The LEDs 625 may be mounted to a PC board with conductive strips forming electrical connections with the LEDs 625 mounted thereon.

Due to the sensors of the disclosed seed monitoring system being positioned on the tube 142 that transports seed and other materials from a storage tank to a field, exposure to significant dust and other particulates is certain. As such, the light source 510, light receivers 520a-520c and any other electronic components described herein may be enclosed and sealed. However, to emit and detect light, the light source 510 and the light receivers 520a-520c use windows to allow light to pass through blocking contaminants. The sensor components are protected, but the windows are regularly exposed to particulates within the tube 142, causing a gradual decline in receiver 220 signals.

Similar to the light source 510, each of the light receivers 520a-520c may comprise one or more light sensors that are enclosed within a sealed housing 240. Each receiver housing 540 includes a window 635 to allow light to pass through the sealed housing to the sensor. As will be appreciate, the light sensors may comprise one of several different types of light sensors. Varying technologies exist for measuring light and/or properties of light and the selection of a sensor type may be based on the specific implementation of the disclosed monitoring system.

Positioned at various other positions along the inside periphery 605 of the tube 142, the light receivers 520a-520c each include a receiver window body 635 secured within the receiver housing 640.

Each of the light receivers 520a-520c is divided into a plurality of light sensing segments 630. Each of the light sensing segments 630 corresponds to a separate light sensor such as photodiode, phototransistor, and other semiconductor type cells or a segment of a light sensor and thus, has a separate output signal. The light sensing segments are on a same substrate with minimal spacing between the segments. For example, the outputs of the light sensing receiver 520a are $I_{sens\_a1}$-$I_{sens\_an}$, with each of the light sensing segments outputting one of the sensing signals $I_{sens\_a1}$-$I_{sens\_an}$.

Dust or other contamination on an optical sensing system scatters the light and changes its direction. In the prior art sensing system, contamination of a transmitter window diffuses the light, which changes the sensitivity pattern and causes false seed detection.

The light source 510 is configured to illuminate the light receivers 520a-520c. The light source 510 uses wide beam LEDs 625. As a result, the light source 510 and the light receivers 520a-520c form a planar sensing area. The area 610 may correspond to the planar sensing area.

Figure 7A:
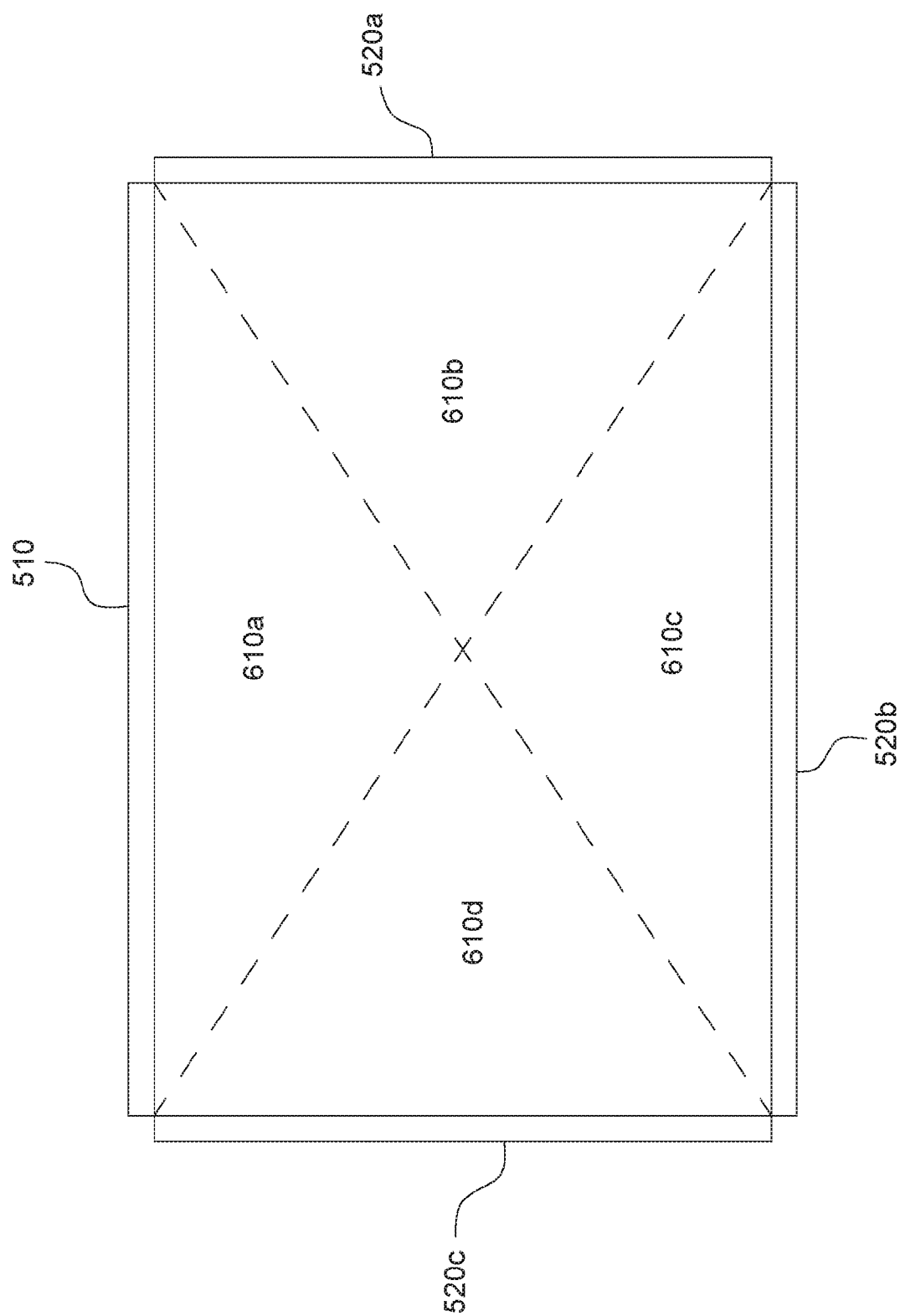

As shown in FIG. 7A, each of the light receivers 520a-520c is positioned to receive illumination through at least one sector within the planar sensing area 610.

FIG. 7A illustrates the planar sensing area 610 being divided into sectors 610a, 610b, 610c and 610d. Due to the arrangement of the light receivers 520a-520c, the light receiver 520a detects seeds in the sectors 610a and 610b, the light receiver 520b detects seeds in the sectors 610a, 610b, 610c and 610d; the light receiver 520c detects seeds in the sectors 610a and 610d.

As will be appreciated by those of ordinary skill in the art, the light source 510 may comprise an illumination source, which is housed within the enclosure 620. Because an LED chip provides 360 degrees of planner illumination, the housing 620 is configured to restrict the illumination angle to 180 degrees. The window 615 is positioned on an open side of the housing 620 and may be produced from translucent plastic, glass, or mineral. The emitter window 615 may include a texture or additive during manufacture to diffuse light from the LEDs.

Dependent on the configuration of the light receivers 520a-520c, the light source 510 may be configured to provide constant illumination. Moreover, the brightness of the light source 510 may be controlled by way of voltage adjustments for incandescent type light bulbs or by way of changing current for an LED. In embodiments where modification of light source 210 properties is desirable or used, the LEDs may be controlled by a driver circuit.

Although the side of the tube 142 having the light source 510 does not include a light receiver, the area in front of the light source 510 is also monitored due to the overlap in coverage of the illumination sectors 610a-610d. This overlap effectively creates a forth "virtual" sector, which serves to square-in the planar area 610. The planar area 610 is defined by having the light source 510 on the side 605a and having each of the light receivers 520a-520c positioned along the other three sides 605b, 605c, 605d.

Figure 7B:
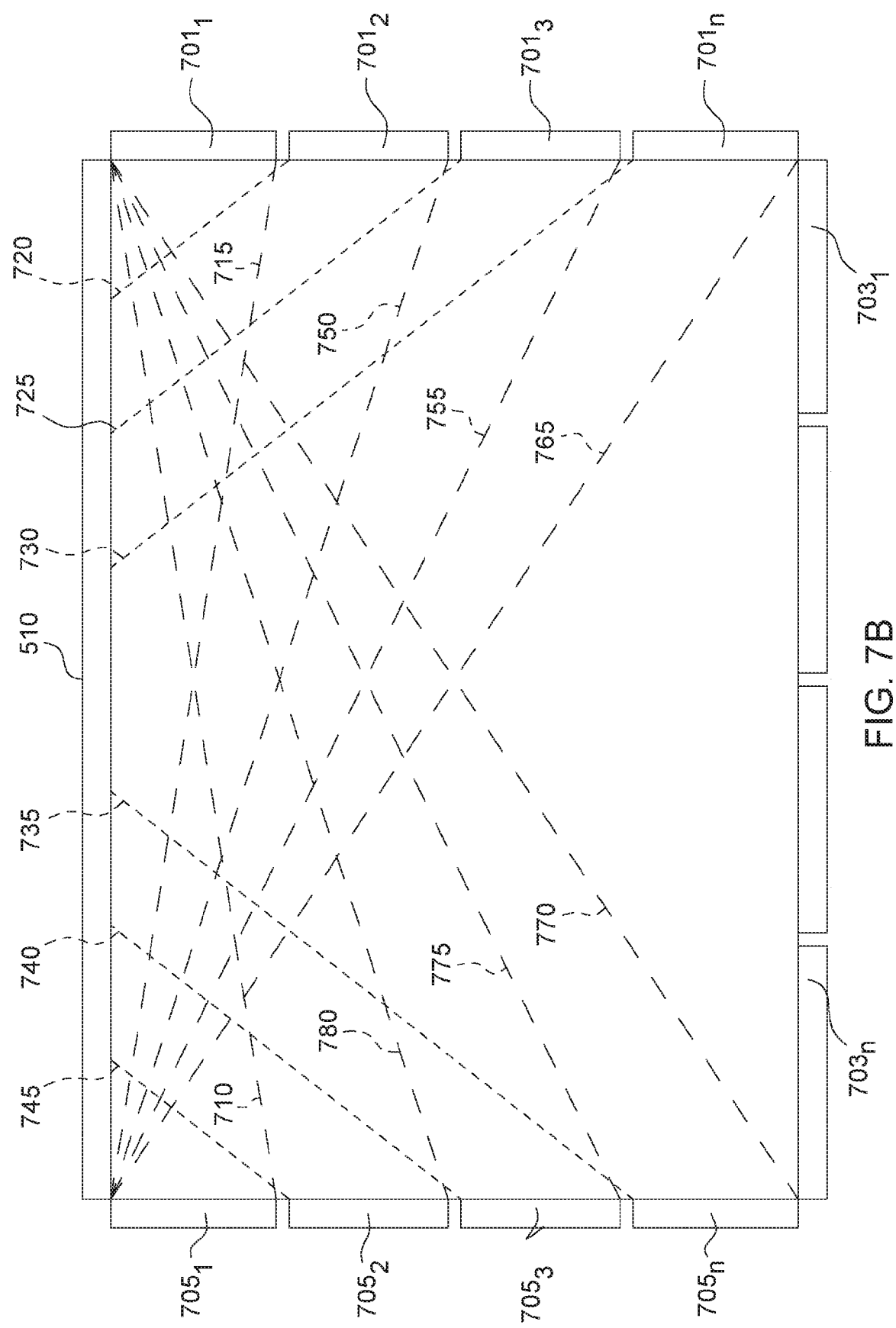

FIG. 7B illustrates light sensing areas for the segments 530 in the light sensing receivers 520a and 520c. As shown in FIG. 7B, the segments 530 are segments $701_1$-$701_n$ for the light receiver 520a, segments $703_1$-$703_n$ for the light receiver 520b and segments $705_1$-$705_n$ for the light receiver 520c. In FIG. 7B, n equals four, but example embodiments are not limited thereto.

With respect to the light receiver 520a, a sensing area of the segment $701_1$ is defined by a line 715 and the light source 510. A sensing area of the segment $701_2$ is defined by lines 720 and 750. A sensing area of the segment $701_3$ is defined by lines 725 and 755. A sensing area of the segment $701_n$ is defined by lines 730 and 765.

With respect to the light receiver 520c, a sensing area of the segment $705_1$ is defined by a line 710 and the light source 510. A sensing area of the segment $705_2$ is defined by lines 745 and 780. A sensing area of the segment $705_3$ is defined by lines 740 and 775. A sensing area of the segment $705_n$ is defined by lines 735 and 770.

As a result, sensing areas of the light sensing receivers 520a and 520c overlap.

As shown FIG. 7B, the sensing areas of the segments $701_1$-$701_n$ and $705_1$-$705_n$ are trapezoidal.

The segments $701_1$-$701_n$ produce the sensing signals $I_{sens\_a1}$-$I_{sens\_an}$, respectively. The sensing signals $I_{sens\_a1}$-$I_{sens\_an}$ correspond to the light sensed by the respective segment.

The segments $705_1$-$705_n$ produce the sensing signals $I_{sens\_c1}$-$I_{sens\_cn}$, respectively. The sensing signals $I_{sens\_c1}$-$I_{sens\_cn}$ correspond to the light sensed by the respective segment.

FIG. 7C illustrates light sensing areas for the segments $703_1$-$703_n$ in in the light sensing receiver 520b.

A sensing area of the segment $703_1$ is defined by line 786 and a surface of the light receiving element 520a that forms a boundary of the area 610. A sensing area of the segment $703_2$ is defined by lines 784 and 788. A sensing area of the segment $703_3$ is defined by lines 782 and 790. A sensing area of the segment $703_n$ is defined by line 780 and a surface of the light receiving element 520c that forms a boundary of the area 610. The segments $703_1$-$703_n$ produce the sensing signals $I_{sens\_b1}$-$I_{sens\_bn}$, respectively. The sensing signals $I_{sens\_b1}$-$I_{sens\_bn}$ correspond to the light sensed by the respective segment.

As shown FIG. 7C, the sensing areas of the segments $703_1$-$703_n$ are quadrilateral.

As shown in FIGS. 5-7B, the monitoring system 500 includes three light receivers. In accordance example embodiments, three light receivers are capable of monitoring the planar space 610 within the tube and produce different signals depending on a seed location in the planar space 610. An overlap in the sectors ensures that the entire space 610 is adequately covered and that clusters of passing seeds can be more accurately detected and counted.

The arrangement illustrated in FIGS. 5-7B is not limited to the discussion herein. For example, in another example embodiment, each light receiver 520a, 520b and 520c is not divided into segments.

In an example embodiment, each segment $701_1$-$701_n$, $703_1$-$703_n$ and $705_1$-$705_n$ includes a separate light sensor such as a photodiode. More specifically, to improve reliability for detecting and counting multiple seeds, each light receiver 520a-520c is divided in four segments $701_1$-$701_n$, $703_1$-$703_n$ and $705_1$-$705_n$, respectively, which acquire light independently. Each segment $701_1$-$701_n$, $703_1$-$703_n$ and $705_1$-$705_n$ detects the light source 510 output through a subsection of the sensing area and significantly increases the overlap in sensing areas of the segments. A seed that passes in an area that closely aligns with the vertical center of the light source 510 may cast a shadow on each of the light receivers 520a-520c and synchronous signals in all receivers indicate the seed in that area. Therefore, a pattern of simultaneous signals in some of receiver segments or channels is used for multiple seed detection and localization.

In another embodiment, detection of multiple passing seeds is facilitated by way of temporal analysis of light modulation. For example, a group of seeds crossing a sensing plane scatters light, thereby producing a modulation that is proportional to a number of seeds and time delays between the first and subsequent passing seeds. Differentiation of the modulated signal reveals fine features of the signal and allows more accurate detection of overlapping seeds.

Referring back to FIG. 5, the light receivers 520a-520c provide the sensing signals $I_{sens\_a1}$-$I_{sens\_an}$, $I_{sens\_b1}$-$I_{sens\_bn}$, $I_{sens\_c1}$-$I_{sens\_cn}$ from the segments $701_1$-$701_n$, $703_1$-$703_n$, $705_1$-$705_n$, respectively, to the conditioning circuits 530a-530c. The conditioning circuits 530a-530c are associated with the light receivers 520a-520c, respectively. Thus, the conditioning circuit 530a receives the sensing signals $I_{sens\_a1}$-$I_{sens\_an}$. The conditioning circuit 530b receives the sensing signals $I_{sens\_b1}$-$I_{sens\_bn}$. The conditioning circuit 530c receives the sensing signals $I_{sens\_c1}$-$I_{sens\_cn}$.

FIG. 8 illustrates an example embodiment of the conditioning circuit 530a. The conditioning circuit 530a is a four-segment amplifier having channels 805, 810, 815 and 820. The channels 805, 810, 815 and 820 are the same. Therefore, for the sake of brevity, only the channel 805 will be described in detail.

The channel 805 includes a transistor U80, resistors R80-R88, capacitors C80-C83 and amplifiers U80-U81. The conditioning circuit 530a receives the sensing signal $I_{sens\_a1}$ at a node N80. A base and a collector of the transistor U80 are connected to the node N80. A first end of the resistor R80 is connected to the node N80 and a second end of the resistor R80 is connected to a positive input of the amplifier U80. A first end of the resistor R81 is connected to an emitter of the transistor U80 and a second end of the resistor R81 is connected to a node N81. A negative input of the amplifier U80, a first end of the resistor R82 and a first end of the capacitor C80 are connected to the node N81. An output of the amplifier U80, a second end of the resistor R82 and a second end of the capacitor C80 are connected at a node N83. A first end of the capacitor C83 is connected to the output of the amplifier U80 and a second end of the capacitor C83 is connected to the first end of the resistor R83. A second end of the resistor R83 is connected to a node N84, which is connected to a negative input of the amplifier U81. The resistor R86 and the capacitor C81 are connected in parallel between the node N84 and a node N85, which is connected to an output of the amplifier U81. A positive input of the amplifier U81 is connected to a first end of the resistor R85. A second end of the resistor R85 is connected to a node N86. The resistor R84 is connected to the voltage power supply Vpower at a first end and to the node N86 at a second end. The capacitor C83 and the resistor R87 are connected in parallel between the node N86 and ground. The resistor R88 is connected to the node N85. The channel outputs the conditioned signal $V_{ST\_a1}$ at a second end of the resistor R88.

The conditioning circuits 530b and 530c are the same as the conditioning circuit 530a. For the sake of brevity, the conditioning circuits 530b and 530c are not described in further detail.

Referring to FIG. 5, the conditioning circuits 530a-530c send the conditioned signals $V_{ST\_a1}$-$V_{ST\_an}$, $V_{ST\_b1}$-$V_{ST\_bn}$, $V_{ST\_c1}$-$V_{ST\_cn}$ to the analog inputs of the controller 550.

The processor 560 may execute a sector-based evaluator 567 to use a pattern of simultaneous amplitudes of the conditioned signals $V_{ST\_a1}$-$V_{ST\_an}$, $V_{ST\_b1}$-$V_{ST\_bn}$, $V_{ST\_c1}$-$V_{ST\_cn}$ for multiple seed detection and localization. For example, patterns of simultaneous amplitudes (Sensitivity Map) for a single seed are generated by the controller 550 using principles of ray optics. Simplest patterns are produced by seeds which fall in corners of the tube. For example, if a seed falls in the right low corner (FIG. 7B) it induces signals only in the segments $703_1$ and $701_n$. A seed falling in the middle of the tube cannot induce signals in the segments $701_1$, $701_2$, $705_1$ and $705_2$. Simultaneous signals in the segments $701_1$, $701_2$, $705_1$ and $705_2$ without signals in the receivers $703_n$ and $705_n$ indicate that two seeds are falling in opposite corners.

In another example embodiment, the processor 560 may detect multiple seeds using a temporal analysis of light modulation. More specifically, a group of seeds crosses the sensing plane 610 and scatters light producing a modulation that is proportional to a number of seeds and time delays between the first and the following seeds. The controller 550 may perform differentiation of the conditioned signals $V_{ST\_a1}$-$V_{ST\_an}$, $V_{ST\_b1}$-$V_{ST\_bn}$, $V_{ST\_c1}$-$V_{ST\_cn}$ to detect overlapping seeds.

Moreover, the processor 560 executes the sector-based evaluator 567 (stored in the memory 565) to determine if any of the conditioned signals $V_{ST\_a1}$-$V_{ST\_an}$, $V_{ST\_b1}$-$V_{ST\_bn}$, $V_{ST\_c1}$-$V_{ST\_cn}$ 250 is saturated or outputs a small amplitude. If any of the conditioned signals $V_{ST\_a1}$-$V_{ST\_an}$, $V_{ST\_b1}$-$V_{ST\_bn}$, $V_{ST\_c1}$-$V_{ST\_cn}$ 250 is saturated or outputs a small amplitude, the processor 560 utilizes a photodiode alert module 569 (stored in the memory 565) to issue a warning that the selected channel saturates or outputs small amplitudes.

Figure 9:
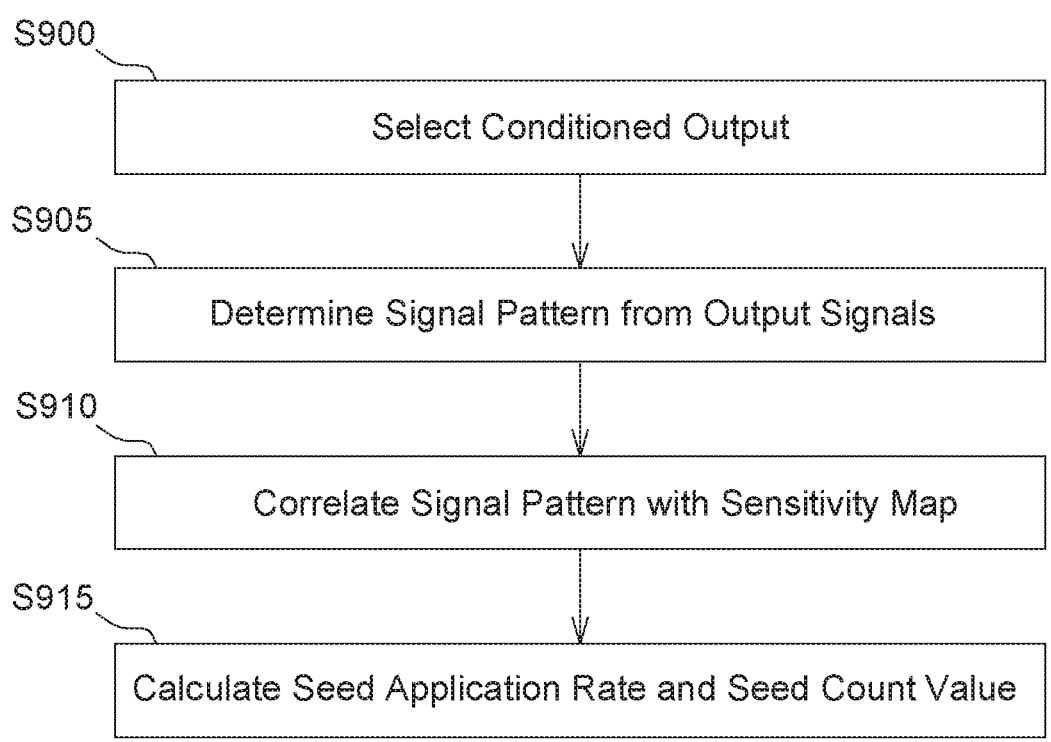

FIG. 9 illustrates a method of determining a seed count value and application rate according to an example embodiment. The method of FIG. 9 may be performed by the system 500. The method of FIG. 9 is described as being performed by the system 500.

At S900, the processor 560 selects the conditioned channels $V_{ST\_a1}$-$V_{ST\_an}$, $V_{ST\_b1}$-$V_{ST\_bn}$, $V_{ST\_c1}$-$V_{ST\_cn}$ which correspond to a seed type and application rate for data analysis. More specifically, the processor 560 monitors the selected conditioned channels and detects time periods when valid signals (higher than a set threshold) appear simultaneously. The signals should overlap.

At S905, the processor 560 determines the signal pattern of the valid simultaneous signals of the selected conditioned channels. The processor 560 generates a pattern of simultaneous amplitudes at S905.

At S910, the processor 560 correlates the determined pattern with a sensitivity map of the sensor that is saved in the memory 565. The sensitivity map is a plurality combinations of expected values for the conditioned signals $V_{ST\_a1}$-$V_{ST\_an}$, $V_{ST\_b1}$-$V_{ST\_bn}$, $V_{ST\_c1}$-$V_{ST\_cn}$ based on various scenarios including a number seeds and locations of the seeds.

The processor 560 compares peaks of the selected conditioned signals $V_{ST\_a1}$-$V_{ST\_an}$, $V_{ST\_b1}$-$V_{ST\_bn}$, $V_{ST\_c1}$-$V_{ST\_cn}$ to determine the location of the seeds. Simultaneous peaks for at least one of the selected conditioned signals $V_{ST\_a1}$-$V_{ST\_an}$, $V_{ST\_b1}$-$V_{ST\_bn}$, $V_{ST\_c1}$-$V_{ST\_cn}$ indicates that a seed is present. Because each of the segments $701_1$-$705_n$ is positioned in a different location around the planar sensing area 610, the location of seed will affect the amount of light received by some of the segments $701_1$-$705_n$. At a time point where at least one of the selected conditioned signals has a peak detected by the microprocessor 560, the microprocessor compares the values of the selected conditioned signals at the time point of the peak. By comparing the values of the selected conditioned signals at the time point of the peak, the microprocessor 560 determines the location of the seed. For example, the microprocessor determines the ratios of the simultaneous values of the selected conditioned signals to each other. The ratios indicate a position of the seed.

The expected ratios of the selected conditioned signals $V_{ST\_a1}$-$V_{ST\_an}$, $V_{ST\_b1}$-$V_{ST\_bn}$, $V_{ST\_c1}$-$V_{ST\_cn}$ for different positions of a seed within the planar sensing area 610 (signal patterns) are saved in the memory 565.

If amplitudes in one of the channels are consistently lower than expected threshold values stored in the memory 565, the processor 560 determines the channel is considered faulty and executes the PD alert module 569 to send a warning to an operator.

At S915, the processor 560 determines a seed application rate and seed count value 915. S915 is described in more detail with respect to FIGS. 10A-10B.

Figure 10A:
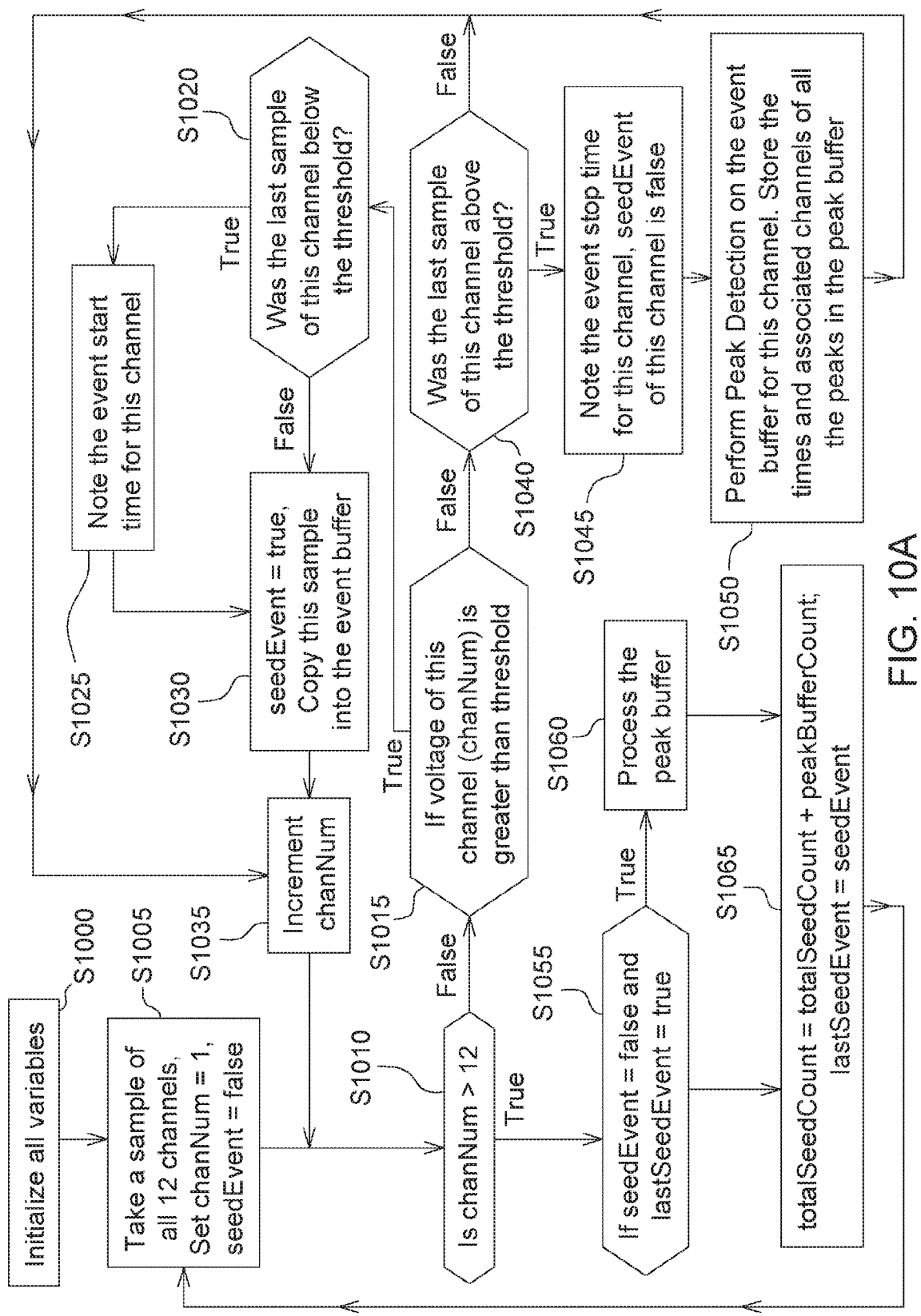
FIGS. 10A-10B illustrate a method of determining a seed count value according to an example embodiment.
Figure 10B:
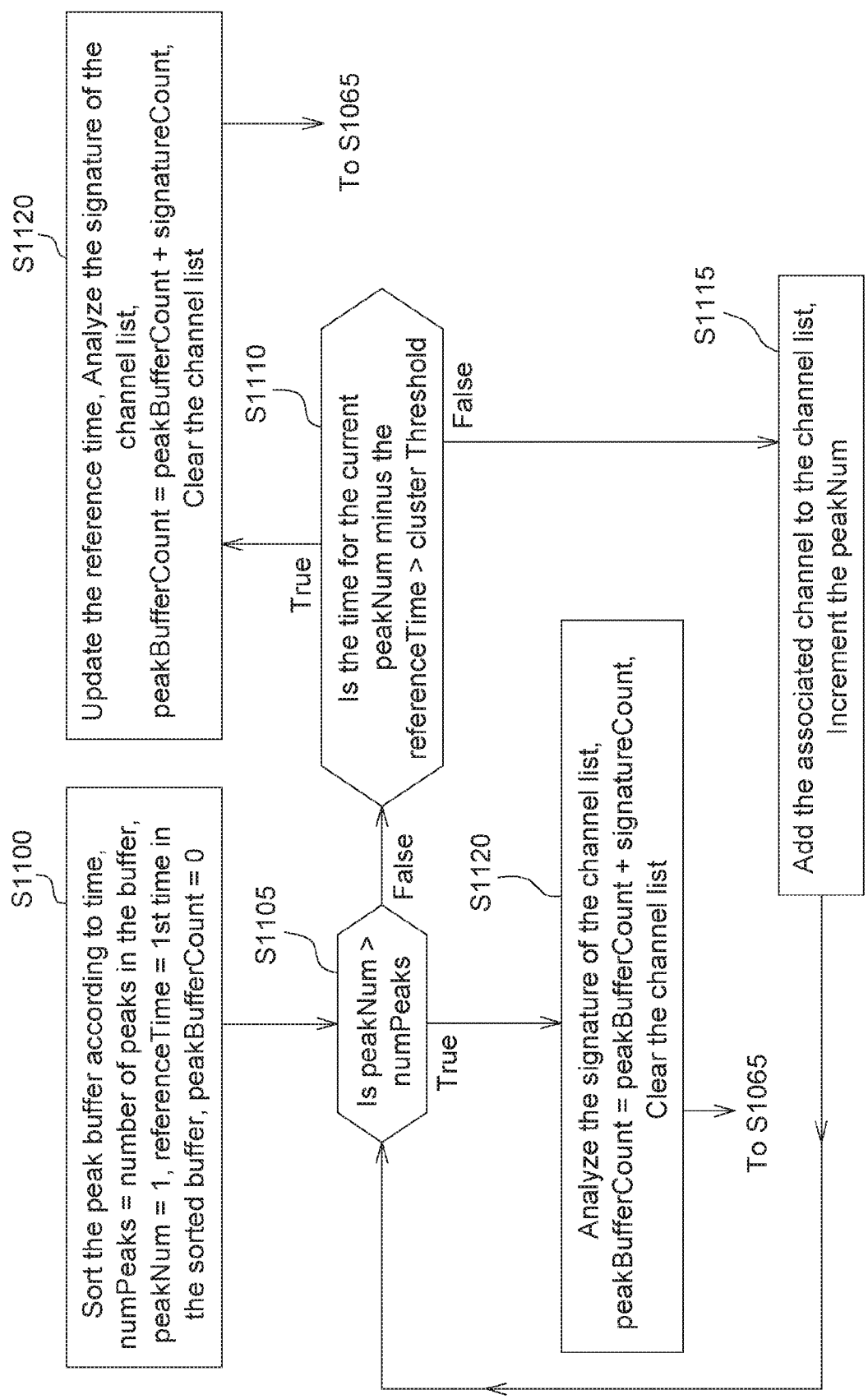

FIGS. 10A-10B illustrate a method of determining a seed count value according to an example embodiment.

At S1000, the processor 560 initializes variables chanNum, seedEvent, lastSeedEvent, numPeaks, peakNum, referenceTime, peakBufferCount and signatureCount.

At S1005, the processor 560 takes a sample of all of the conditioned signals $V_{ST\_a1}$-$V_{ST\_an}$, $V_{ST\_b1}$-$V_{ST\_bn}$, $V_{ST\_c1}$-$V_{ST\_cn}$, sets the channel number chanNum to one and sets the seed event variable seedEvent to be false.

At S1010, the processor 560 determines if the channel number chanNum is greater than the number of conditioned signals (e.g., twelve). If the channel number chanNum is less than twelve, the processor 560 determines if the voltage of the sample of the channel number is greater than a threshold voltage at S1015. The threshold voltage may be determined based on empirical data.

If the voltage of the sample of the channel number is greater than the threshold voltage, the processor 560 determines if the last sample of the channel number was below the threshold at S1020. If the last sample was below the threshold, the processor 560 determines that the sample corresponds to an event start time for the channel number at S1025. The processor 560 then sets the seed event variable seedEvent to be true and copies the sample into an event buffer at S1030. The event buffer may be in the memory 565.

If the last sample was not below the threshold, the processor 560 also proceeds to S1030.

At S1035, the processor increases the channel number chanNum by one.

If the voltage of the sample of the channel number is not greater than the threshold voltage at S1015, the processor 560 determines if the last sample of the channel number was above the threshold at S1040. If the last sample was not greater than the threshold voltage, the processor increases the channel number by one at S1035. If the last sample was above the threshold, the processor 560 determines that the sample corresponds to an event stop time for the channel number and sets the seed event variable seedEvent to be false at S1045.

At S1050, the processor 560 performs peak detection on the event buffer for the channel. The processor 560 monitors values of successive samples in the channel and, if after a rising sequence of values, the processor 560 sees two or three a number of values (e.g., two or three) of falling sequence the processor 560 records a peak for the channel and the time of the peak.

The processor 560 stores the times and associated channels of the peaks in the peak buffer.

At S1055, all channels have been analyzed by the processor 560. Thus, a pattern of the channels is established. Once the channel number chanNum exceeds the number of channels, the processor 560 determines if the seedEvent is false (no seed was detected) and if the lastSeedEvent is true at S1055. If the condition is true at S1055 the processor 560 processes the peak buffer at S1060 and determines the number of seeds in the seed event (peakBufferCount). At S1065 the processor 560 updates the totalSeedCount and starts new cycle by returning to S1000.

FIG. 10B illustrates an example of processing the peak buffer.

At S1100, the processor 560 sorts the peak buffer according to the times of the peaks, sets the variable numPeaks to the number of peaks in the peak buffer, sets peakNum to one, sets referenceTime to the first time in the sorted buffer and sets peakBufferCount to zero.

At S1105, the processor 560 determines if the current peak number peakNum is greater than the number of peaks numPeaks. If the current peak number peakNum is not greater than the number of peaks numPeaks, the processor 560 determines if the time for the current peak number peakNum minus referenceTime is greater than a cluster threshold at S1110. The cluster threshold determines the maximum duration of a multi-seeds event.

If the difference between the time for the current peak number peakNum and referenceTime is less than or equal to the cluster threshold, the processor 560 adds the associated channel to a channel list and changes the current peak number by incrementing peakNum by one.

If the difference between the time for the current peak number peakNum and referenceTime is greater than the cluster threshold, the processor 560 updates referenceTime to be the time for the current peak number peakNum at S1120 and analyzes the signature of the channel list and sets a new peak buffer count (number of seeds) to be the current peakBufferCount plus the signatureCount. A signature is a pattern of simultaneous signals in different channels that represent a seed event. Patterns are developed from the sensitivity map for single and multi-seeds events. The signatureCount represents a number of seeds in the seed event and the channel list includes all channels which are being analyzed during the seed event to determine a signature. Once the processor 560 has performed S1120, a multi-seed even has ended and the peakBufferCount transferred for S1065.

If the selected peak number peakNum is greater than the number of peaks numPeaks, the processor 560 analyzes the signature and determines a number of seeds in the event at S1125. More specifically, the processor sets a new peak buffer count (number of seeds) to be the current peakBufferCount plus the signatureCount. The method returns to S1065.

Referring back to FIG. 10A, after the peak buffer is processed by the processor 560, the processor 560 increases the total seed count value totalSeedCount by the peakBufferCount and sets the lastSeedEvent to be equal to the seedEvent at S1065. If the condition is false at S1055, the processor 560 proceeds to S1065.

According to an example embodiment, a seed monitoring system includes a light source configured to emit light along a plane of an interior of a seed tube, a plurality of light receivers around the plane of the interior of the seed tube, each of the plurality of light receivers configured to receive light in at least two sectors of a plurality of sectors of the plane and generate a sensing signal corresponding to the received light, a processing system including a plurality of conditioning channels, the processing system configured to process the sensing signals to generate conditioned signals and a controller configured to generate a seed count value based on the generated conditioned signals.

In an example embodiment, the controller is configured to determine positions of seeds within the seed tube based on the generated conditioned signals.

In an example embodiment, the seed tube includes a first wall, a second wall, a third wall and a fourth wall, the second wall is between the first wall and the third wall and the fourth wall is between the third wall and the first wall, the light source is on the first wall, and the plurality of light receivers are on the second wall, the third wall and the fourth wall, respectively.

In an example embodiment, each of the plurality of light receivers includes a plurality of light sensing elements, wherein each light sensing element is positioned to receive at least a portion of the light in the at least two sectors associated with the light receiver.

In an example embodiment, the light source and the plurality of receivers define the entire plane and the plurality of sectors cover the entire plane.

In an example embodiment, the controller is configured to detect an abnormality in at least one of the plurality of light receivers and generate the seed count value based on the generated conditioned signals from the other plurality of light receivers.

Example embodiments being thus described, it will be obvious that the same may be varied in many ways. For example, the system 200 may also take into account seed type when determining a seed count value. Such variations are not to be regarded as a departure from the spirit and scope of example embodiments, and all such modifications as would be obvious to one skilled in the art are intended to be included within the scope of the claims.

What is claimed is:

1. A seed monitoring system comprising:
a light source configured to emit light in an interior of a seed tube;
a plurality of light receivers, each of the plurality of light receivers configured to receive light in at least two sectors of a plurality of sectors of a plane in the interior of the seed tube and generate a sensing signal corresponding to the received light, at least two of the plurality of light receivers opposing each other across the plane and are arranged to receive the received light from the light source, the at least two of the plurality of light receivers being on different walls of the seed tube than the light source;
a processing system including a plurality of conditioning channels, the processing system configured to process the sensing signals to generate conditioned signals; and
a controller configured to generate a seed count value based on the generated conditioned signals.

2. The seed monitoring system of claim 1, wherein the plurality of sectors are triangular.

3. The seed monitoring system of claim 1, wherein the plurality of light receivers includes,
a first light receiver configured to receive first light in a first sector and second light in a second sector of the plurality of sectors; and
a second light receiver configured to receive third light in the second sector and fourth light in a third sector of the plurality of sectors.

4. The seed monitoring system of claim 3, wherein the plurality of light receivers includes,
a third light receiver configured to receive fifth light in the first sector, sixth light in the second sector and seventh light in the third sector.

5. The seed monitoring system of claim 4, wherein the third light receiver is configured to receive eighth light in a fourth sector of the plurality of sectors.

6. The seed monitoring system of claim 1, wherein the controller is configured to determine positions of seeds within the seed tube based on the generated conditioned signals.

7. The seed monitoring system of claim 1, wherein
the seed tube includes a first wall, a second wall, a third wall and a fourth wall, the second wall is between the first wall and the third wall and the fourth wall is between the third wall and the first wall,
the light source is on the first wall, and
the plurality of light receivers are on the second wall, the third wall and the fourth wall, respectively.

8. The seed monitoring system of claim 1, wherein each of the plurality of light receivers includes a plurality of light sensing elements, wherein each light sensing element is positioned to receive at least a portion of the light in the at least two sectors associated with the light receiver.

9. The seed monitoring system of claim 1, wherein the light source and the plurality of receivers define the plane and the plurality of sectors cover the plane.

10. The seed monitoring system of claim 1, wherein the controller is configured to detect an abnormality in at least one of the plurality of light receivers and generate the seed count value based on the generated conditioned signals from the other plurality of light receivers.

11. A method of monitoring seeds comprising:
emitting light, by a light source, in an interior of a seed tube;
receiving light, by a plurality of light receivers, in at least two sectors of a plurality of sectors of a plane in the interior of the seed tube and generating a sensing signal corresponding to the received light, at least one of the plurality of light receivers configured to receive the light in at the least two sectors of a plurality of sectors, the at least one of the plurality of light receivers and another of the plurality of light receivers opposing each other across the plane and are arranged to receive at least a portion of the emitted light, the at least two of the plurality of light receivers being on different walls of the seed tube than the light source;

processing the sensing signals to generate conditioned signals; and generating a seed count value based on the generated conditioned signals.

12. The method of claim 11, wherein the plurality of sectors are triangular.

13. The method of claim 11, wherein the receiving includes, receiving first light in a first sector and second light in a second sector of the plurality of sectors by a first light receiver; and receiving third light in the second sector and fourth light in a third sector of the plurality of sectors by a second light receiver.

14. The method of claim 13, wherein the receiving includes, receiving fifth light in the first sector, sixth light in the second sector and seventh light in the third sector by a third light receiver.

15. The method of claim 14, wherein the receiving includes, receiving eighth light in a fourth sector of the plurality of sectors by the third light receiver.

16. The method of claim 11, further comprising:

determining positions of seeds within the seed tube based on the generated conditioned signals.

17. The method of claim 11, wherein the generating includes, detecting an abnormality in at least one of the plurality of light receivers; and generating the seed count value based on the generated conditioned signals from the other plurality of light receivers.

18. The seed monitoring system of claim 1, wherein the light source is a single light source.

19. The method of claim 11, wherein the light source is a single light source.

* * * * *